Aug. 5, 1958
W. B. KIRK
2,846,272
FLUID PRESSURE BRAKE APPARATUS WITH EQUALIZING
RESERVOIR PRESSURE BUILD-BACK PREVENTING MEANS
Filed Feb. 3, 1956
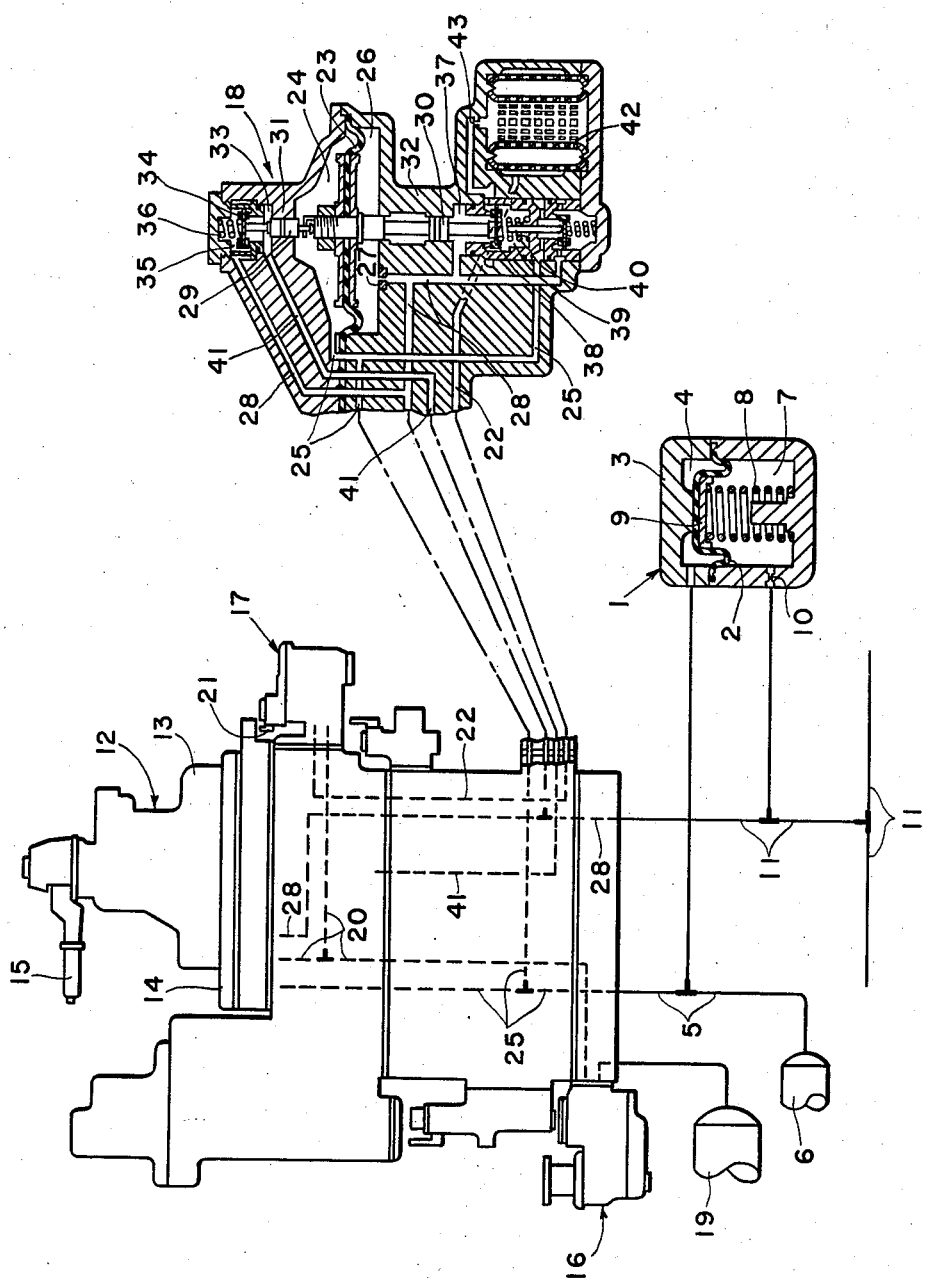
INVENTOR.
Walter B. Kirk
BY
Adelbert A. Steinmiller
Attorney 2,846,272

FLUID PRESSURE BRAKE APPARATUS WITH EQUALIZING RESERVOIR PRESSURE BUILD-BACK PREVENTING MEANS

Walter B. Kirk, East McKeesport, Pa., assignor to Westinghouse Air Brake Company, Wilmerding, Pa., a corporation of Pennsylvania Application February 3, 1956, Serial No. 563,260

9 Claims. (Cl. 303—55)

This invention relates to locomotive fluid pressure brake apparatus, and more particularly to such apparatus embodying means for nullifying the effect of an undesirable partial build-back of fluid pressure in an equalizing reservoir due to belated absorption of heat through the wall of said reservoir following an operator-effected reduction in such pressure for initiating a brake application.

In the copending application of Harry C. May, U. S. Serial No. 509,198, filed May 18, 1955, and assigned to the assignee of the present invention, there is shown and described a locomotive brake apparatus that comprises, briefly, an engineer's automatic brake valve device which is operable successively to a service position for causing a service rate of reduction in pressure of fluid in an equalizing reservoir of a selectable degree and then to a lap position for terminating such reduction. This apparatus also comprises an equalizing valve device having a movable abutment which responds to this reduction in equalizing reservoir pressure to operatively unseat a brake pipe discharge valve for effecting a corresponding reduction in pressure of fluid in a brake pipe and thereby causing a service application of brakes of a corresponding degree. During and in consequence of this reduction in equalizing reservoir pressure, the temperature of fluid in the equalizing reservoir will be reduced a generally proportionate extent below the temperature of the ambient air surrounding the reservoir wall, with the result that the temperature and hence the pressure of fluid in the equalizing reservoir will build back or increase due to the effect of the heat belatedly absorbed from the ambient air through the reservoir wall; the extent of such build-back being approximately 1 p. s. i. for each 5 p. s. i. of operator-effected reduction in equalizing reservoir pressure.

Any such build-back which occurs while the brake pipe discharge valve is open, but after the brake valve device is operated to lap position, will result in brake pipe pressure being reduced a slightly lesser degree than that called for by the operator-effected reduction in equalizing reservoir pressure, which is not especially serious. However, if the brake apparatus is conditioned to provide flat maintaining, any such build-back in equalizing reservoir pressure in excess of about 1 p. s. i. following closure of the brake pipe discharge valve will cause the movable abutment of the equalizing valve device to operatively unseat a maintaining valve for thereby causing an increase in brake pipe pressure, in the same manner as if brake pipe pressure had been reduced below equalizing reservoir pressure due to brake pipe leakage. Since the brake controlling valves in current use in the United States are of the direct release type, subject to opposing fluid pressures in the brake pipe and auxiliary reservoir, an increase in brake pipe pressure of about 1 to 1½ p. s. i. above the then lapped auxiliary reservoir pressure will be sufficient to cause the brake controlling valves on the locomotive and all cars to shift to release position and thereby effect a direct and complete release of brakes throughout the train.

In order to prevent this undesirable condition, it is necessary with apparatus of the above type to momentarily move the brake valve device from lap position to service position and then back to lap position in several successive operations to bleed off equalizing reservoir pressure as it tends to build back, until the equalizing reservoir pressure gauge remains at the desired pressure and thus indicates that the temperatures of the ambient air and equalizing reservoir air have equalized.

The principal object of this invention is to provide an improved brake apparatus embodying a novel arrangement for nullifying the effect of the pressure which builds back in the equalizing reservoir due to the belated absorption of heat from the ambient air surrounding the reservoir following closure of the brake pipe discharge valve.

Another object is to provide an improved brake apparatus embodying a novel displacement device or expandable volume for automatically nullifying the effect of the build-back in equalizing reservoir pressure that occurs following closure of the brake pipe discharge valve, so as to thereby obviate the necessity for manually operating the brake valve device in the above-described manner to bleed off such excess equalizing reservoir pressure.

According to the foregoing objects, the improved brake apparatus includes a movable abutment that is subject at one side to equalizing reservoir pressure and at the opposite side to pressure of a light bias spring and to pressure of fluid in a chamber that is open to the brake pipe. With this arrangement, if equalizing reservoir pressure builds back more than a predetermined small degree (such as .3 to .5 p. s. i.) following closure of the brake pipe discharge valve, the movable abutment will shift against resistance of the spring for thereby expanding the effective volume of the equalizing reservoir, and in so doing nullify the effect of the excess equalizing reservoir pressure before the maintaining valve can be unseated by the movable abutment of the equalizing valve device.

Other objects and advantages will become apparent from the following more detailed description of the invention and from the accompanying drawing, wherein the single figure is a diagrammatic view of an improved brake apparatus embodying the invention.

*Description*

As shown in the drawing, there is provided according to the invention a displacement device 1 which may, for sake of illustration, comprise a flexible diaphragm 2 that is suitably clamped about its outer edge between sections of a sectionalized casing 3. The diaphragm 2 is subject at one side to pressure of fluid in a chamber 4 that is in constant unrestricted communication by way of a pipe 5 with an equalizing reservoir 6. The diaphragm 2 is subject at the opposite side to pressure of fluid in a chamber 7 and to the pressure of a helical bias spring 8 which is contained in said chamber and acts on the diaphragm through the medium of a diaphragm follower 9; said chamber 7 being constantly open, preferably by way of a choke 10, to a brake pipe 11 which extends from the locomotive and from car to car through the train.

The displacement device 1 may be associated with a locomotive fluid pressure brake apparatus of any well-known type, such as that shown and described in the aforementioned copending application. This brake apparatus includes an engineer's automatic brake valve device 12 comprising a rotary valve 13 (not shown in detail) contained in a sectionalized casing 14 and operable by arcuate movement of a handle 15 to various positions, hereinafter to be described, for effecting various porting connections. Contained in the casing 14 are a feed valve device 16, a brake pipe flat maintaining cut-out valve device 17, and an equalizing valve device 18.

As more fully described in the aforementioned copending application, the feed valve device 16 is supplied with fluid under pressure from a main reservoir 19 on the locomotive and operates to provide in a passage 20 fluid at a desired lesser pressure corresponding to the normal full charge value of brake pipe pressure. The brake pipe flat maintaining cut-out valve device 17 comprises valve means (not shown) operable responsively to movement of a handle 21 to a maintaining position to connect a branch of passage 20 to a passage 22 for cutting in the brake pipe flat maintaining feature, and operable responsively to movement of said handle to a cut-out position to disestablish such connection for cutting out the flat maintaining feature.

The equalizing valve device 18 comprises, briefly, a movable abutment 23 subject at one side to pressure of fluid in a chamber 24 constantly open to the equalizing reservoir 6 via a passage 25 and a branch of the pipe 5, and subject at the opposite side to pressure of fluid in a chamber 26 that is constantly open to a branch of the brake pipe 11 via a baffle choke 27 and a passage 28. Coaxially attached to opposite sides of the movable abutment 23 are cylindrical stems 29, 30, having sealing, slidably guided engagement with the walls of respective aligned bores through casing partitions 31, 32, respectively. Casing partition 31 separates chamber 24 from a chamber 33 at one side of a preferably disc-shaped brake pipe discharge valve 34 which is arranged in a chamber 35 and is urged to a seated position by a helical spring 36 in the latter chamber, for normally preventing fluid pressure communication between the chambers 33 and 35. Casing partition 32 separates chamber 26 from a chamber 37 at one side of a preferably disc-shaped maintaining valve 38 that is contained in a chamber 39 and is urged to a seated position by a helical bias spring 40 in the latter chamber, for normally preventing fluid pressure communication between the chambers 37 and 39.

As more fully described in the aforementioned copending application, this brake apparatus is initially charged by moving the handle 15 of brake valve device 12 to a running position for causing fluid under pressure to be supplied via a branch of passage 20 and the rotary valve 13 to branches of the brake pipe passage 28 and equalizing reservoir passage 25 for respectively charging the brake pipe 11 and equalizing reservoir 6 to the normal full charge value of brake pipe pressure.

Upon completion of initial charging, equalizing reservoir pressure in chamber 24 and brake pipe pressure in chamber 26 of equalizing valve device 18 will be equal, and hence the movable abutment 23 will be biased by the springs 36 and 40 to an intermediate or lap position, in which it is shown, and in which said springs seat the respective valves 34 and 38.

To effect a service application of brakes, the brake valve handle 15 is moved to a service position (or initially to a first service position and then, after a short interval, to service position), for causing fluid under pressure to be released at a service rate from the equalizing reservoir 6 via passage 25, the rotary valve 13, and a restricted passageway (not shown) leading to atmosphere. This reduction in equalizing reservoir pressure will be noted in chamber 24 of equalizing valve device 18. When brake pipe pressure in chamber 26 exceeds equalizing reservoir pressure in chamber 24 by a chosen degree, such as about ¾ p. s. i., as determined by the value of spring 36, the movable abutment 23 will shift for operatively unseating the brake pipe discharge valve 34 through the medium of the stem 29; whereupon fluid under pressure will be released from the brake pipe 11 by flow via a branch of passage 28, chamber 35, past the unseated valve 34, to chamber 33, and thence via a passage 41, the usual service choke (not shown) and rotary valve 13 to atmosphere, for causing a restricted rate of reduction in brake pipe pressure.

When equalizing reservoir pressure has been reduced a degree corresponding to the degree of service application desired, the brake valve handle 15 is moved to a lap position for bottling up fluid in the equalizing reservoir 6 at the desired reduced pressure. When brake pipe pressure has been reduced, by flow past the brake pipe discharge valve 34, to a value slightly above the chosen reduced value of equalizing reservoir pressure, the movable abutment 23 will be returned to its lap position by spring 36 and the brake pipe discharge valve 34 will be reseated for terminating the release of brake pipe pressure.

It is to be noted that the volume of the equalizing reservoir 6 is constant, whereas the volume of the brake pipe 11 will vary with the length of the train. Hence, the longer the train, the longer the brake pipe discharge valve 34 must remain open after the brake valve handle 15 is moved to lap position, in order to reduce brake pipe pressure to substantially the value of equalizing reservoir pressure. Any build-back of equalizing reservoir pressure which is caused by the heat belatedly absorbed from the ambient air after the brake valve handle is moved to lap position but before the brake pipe discharge valve closes can cause said discharge valve to close when brake pipe pressure has been reduced a degree corresponding substantially to the existing built-back or increased value of equalizing reservoir pressure instead of the chosen lesser pressure corresponding to the operator-effected reduction; but this can be easily compensated for on a long train by effecting an initial reduction in equalizing reservoir pressure of a degree slightly greater than that ultimately desired, so that the desired degree of brake application will be effected despite such build-back in equalizing reservoir pressure.

Assume now, however, that with apparatus heretofore proposed and not embodying the displacement device 1, the brake pipe flat maintaining cut-out valve handle 21 is in maintaining position and that, after the brake pipe discharge valve 34 has closed, equalizing reservoir pressure increases, such as due to the above-described build-back, to an extent where it exceeds brake pipe pressure by a selected degree, such as about 1 to 1¼ p. s. i., as determined by the value of spring 40. Under this condition, the movable abutment 23 will be shifted and, through the medium of stem 30, unseat the maintaining valve 38 against resistance of spring 40; whereupon fluid under pressure will flow from the then charged passage 22 through a curled hair strainer 42 and a brake pipe maintaining limiting choke 43 to chamber 39, whence it will flow past the unseated valve 38 to chamber 37 and thence via a branch of passage 28 to the brake pipe 11 for increasing brake pipe pressure until it is within about 1 p. s. i. of equalizing reservoir pressure, in the same manner as if—without any such build-back—brake pipe pressure had reduced below equalizing reservoir pressure due to brake pipe leakage. If this build-back in equalizing reservoir pressure which occurs after closure of the brake pipe discharge valve is sufficient to cause an increase in brake pipe pressure of about 1 to 1½ p. s. i., the brake controlling valves on the locomotive and all cars will operate to effect a direct and complete release of brakes from the rear toward the front of the train, which is of course very undesirable.

According to the invention, the displacement device 1 is provided for nullifying the effect of any built-back in equalizing reservoir pressure which occurs after closure of the brake pipe discharge valve 34, so as to prevent this undesirable release of brakes, as will now be shown.

It will be apparent that while the brake valve handle 15 is in service position for reducing equalizing reservoir pressure, such pressure will always be less than the pressure in chamber 7 because of the bias effect, illustratively assumed as about ¾ p. s. i. of spring 36. It will also be apparent that the pressure in chamber 7 will exceed equalizing reservoir pressure as noted in chamber 4 so long as the brake pipe discharge valve 34 is open, because said valve will not close until brake pipe pressure has been reduced to a value slightly higher than equalizing reservoir pressure, as determined by the value of spring 36.

Hence, the diaphragm 2 of displacement device 1 will be maintained in a normal position, in which it is shown, by pressure of spring 8 while the brake valve handle 15 is in service position and until, following movement of said handle to lap position, the brake pipe discharge valve 34 closes.

If, with the improved brake apparatus embodying the displacement device 1, equalizing reservoir pressure and hence the pressure in chamber 4 should build back, after closure of the brake pipe discharge valve, to a degree where such pressure exceeds the pressure in chamber 7 by a chosen degree, such as about .3 to .5 p. s. i., as determined by the chosen value of spring 8, the diaphragm 2 will be deflected against resistance of said spring from its normal position to another position, defined by contact of the follower 9 with a suitable stop formed in the end wall of chamber 7. The effective area and length of travel of the diaphragm 2 are such that in moving from its normal to its other position the effective volume of the equalizing reservoir 6 will be increased to an extent sufficient to absorb or accommodate an eventual total build-back in equalizing reservoir pressure of a selected degree, such as about 1 to 2 p. s. i., so as to prevent a differential across the equalizing valve movable abutment 23 sufficient to cause unseating of the maintaining valve 38.

The choke 10 is preferably provided to so restrict the rate of flow between the brake pipe 11 and chamber 7 that it will take at least a prescribed period of time for the diaphragm 2 to deflect from its normal position to its other position, so as to thereby effect a slow rate of absorption of the equalizing reservoir pressure increase. In other words, the choke 10 desirably delays the corrective effect to more nearly approximate the rate at which equalizing reservoir pressure builds back due to the temperature change resultant from belated absorption of heat from the ambient air, and thus tends to prevent cycling operation of the diaphragm 2. The choke 10 also assures that opening of the brake pipe maintaining valve 38 will not be unduly delayed if the rate of brake pipe pressure leakage exceeds the rate of such build-back in equalizing reservoir pressure, as will now be shown.

Assume that, due to brake pipe leakage, brake pipe pressure and hence the pressure in chamber 26 of equalizing valve device 18 should reduce faster than equalizing reservoir pressure builds back. If the chamber 7 of device 1 is not isolated from the brake pipe 11 by the choke 10, the pressure in chamber 7 will, under the assumed condition, reduce as rapidly as brake pipe pressure, and hence the diaphragm 2 will promptly deflect to its other position against resistance of spring 8 primarily in consequence of the reduction in brake pipe pressure rather than because of the build-back in equalizing reservoir pressure; and if the diaphragm 2 does deflect to its other position, it will expand the effective volume of the equalizing reservoir 6 to its maximum degree and thus cause a reduction in equalizing reservoir pressure, which in turn will cause unseating of the maintaining valve 38 to be deferred until brake pipe pressure is reduced more than the illustrative ¾ p. s. i. below the thus reduced value of equalizing reservoir pressure. On the other hand, if the choke 10 is provided, the pressure in chamber 7 will not reduce at the same rate as brake pipe pressure reduces due to leakage; and hence, under the assumed condition, the diaphragm 2 will be either in its normal position or intermediate its normal and other positions at the time brake pipe pressure is reduced the illustrative ¾ p. s. i. below existing equalizing reservoir pressure, which latter pressure will then obviously be at a higher value than if no choke 10 is provided because the effective volume of the equalizing reservoir 6 will not yet have been expanded to the maximum degree obtained with the diaphragm 2 in its other position.

When the brake valve handle 15 is moved to running position for recharging the equalizing reservoir 6 and brake pipe 11 to the normal full charge value of brake pipe pressure via communications previously described, in order to effect a release of brakes throughout the train, equalizing reservoir pressure will generally increase at a somewhat faster rate than brake pipe pressure. This may cause the diaphragm 2 to deflect from its normal to its other position (if not already there). However, this is of no importance and as soon as brake pipe pressure as noted in chamber 7 has increased to substantially its full charge value, the spring 8 will be effective to bias the diaphragm 2 to its normal position, for thereby releasing fluid under pressure from chamber 4 into the passage 20 by reverse flow through the equalizing reservoir charging communication.

*Summary*

It will now be seen that the improved brake apparatus embodies a displacement device 1 subject to pressure of fluid in an equalizing reservoir 6 and an opposing pressure of fluid in a chamber 7 open to a brake pipe 11. The device 1 is biased to a normal position by a spring 8 in the chamber 7; but if equalizing reservoir pressure builds back or increases above the pressure in chamber 7 by more than a predetermined small degree, such as about .3 to .5 p. s. i., due to absorption of heat from the ambient air through the wall of the equalizing reservoir 6 following closure of the brake pipe discharge valve 34, then the device 1 will shift against said spring to another position for expanding the effective volume of said equalizing reservoir so as to nullify the effect of the excess equalizing reservoir pressure before it can undesirably cause the maintaining valve 38 to be unseated.

The chamber 7 is preferably isolated from the brake pipe 11 by way of a choke 10 which tunes the corrective operation of the device 1 so that it will nullify the effect of the above-described build-back in equalizing reservoir pressure at approximately the same rate as such build-back occurs and accommodate a total build-back of as much as 1 to 2 p. s. i. The choke 10 also assures that operation of the maintaining valve 38 will not be undesirably and unduly delayed if the rate of brake pipe leakage exceeds the rate of such equalizing reservoir pressure build-back.

Having now described the invention, what I claim as new and desire to secure by Letters Patent, is:

1. In a fluid pressure brake apparatus, the combination of a brake pipe, an equalizing reservoir, operator-controlled means operable to one position for effecting a desired reduction in equalizing reservoir pressure and to another position for bottling up fluid in the equalizing reservoir at reduced pressure, valve means responsive to this reduction in equalizing reservoir pressure for effecting a substantially corresponding reduction in brake pipe pressure, means responsive to an increase in equalizing reservoir pressure in excess of a chosen degree above an opposing pressure in a chamber to effect an increase in the effective volume of said equalizing reservoir sufficient to absorb and nullify the effect of an overall increase in equalizing reservoir pressure of a selected degree, greater than said chosen degree, and flow restricting means interposed between said chamber and brake pipe for so limiting the rate of release of fluid under pressure from said chamber that the last named means will operate to effect such increase in effective volume at a rate approximating that at which equalizing reservoir pressure will tend to increase due to the increase in temperature of equalizing reservoir fluid caused by belated absorption of heat from the ambient air surrounding the reservoir following the reduction in the pressure and hence in the temperature of fluid in said reservoir.

2. In a fluid pressure brake apparatus, the combination of a brake pipe, an equalizing reservoir, operator-controlled means operable to one position for effecting a desired reduction in equalizing reservoir pressure and to another position for bottling up fluid in the equalizing reservoir at reduced pressure, maintaining valve means responsive to a preponderance in equalizing reservoir pressure over opposing brake pipe pressure in excess of a predetermined degree to effect supply of fluid under pressure to said brake pipe for restoring brake pipe pressure to substantially said predetermined degree less than equalizing reservoir pressure, and means responsive to an increase in equalizing reservoir pressure in excess of a chosen degree, less than said predetermined degree, relative to an opposing pressure of fluid in a chamber open to the brake pipe to so increase the effective volume of said equalizing reservoir as to substantially nullify the effect of said increase in equalizing reservoir pressure for thereby preventing such operation of said maintaining valve means unless brake pipe pressure reduces, as due to brake pipe leakage, more than said predetermined degree below existing equalizing reservoir pressure.

3. In a fluid pressure brake apparatus, the combination of a brake pipe, an equalizing reservoir, operator-controlled means operable to one position for effecting a desired reduction in equalizing reservoir pressure and to another position for bottling up fluid in the equalizing reservoir at reduced pressure, maintaining valve means responsive to a preponderance in equalizing reservoir pressure over opposing brake pipe pressure in excess of a predetermined degree to move to an open position for effecting supply of fluid under pressure to said brake pipe for restoring brake pipe pressure to substantially said predetermined degree less than equalizing reservoir pressure, and displacement means comprising movable abutment means subject to equalizing reservoir pressure and to an opposing pressure of fluid in a chamber open to the brake pipe, said movable abutment means being biased to a normal position against equalizing reservoir pressure and responsive to a preponderance in equalizing reservoir pressure over chamber pressure in excess of a chosen degree, less than said predetermined degree, to move to another position for so expanding the effective volume of said equalizing reservoir as to reduce the pressure of fluid therein sufficiently to assure against operation of said maintaining valve means to its open position unless brake pipe pressure reduces more than said predetermined degree below existing equalizing reservoir pressure.

4. The combination according to claim 3, including flow restricting means interposed between said chamber and brake pipe for retarding the operation of said movable abutment means from its said normal position to its said other position.

5. In a fluid pressure brake apparatus, the combination of a brake pipe, an equalizing reservoir, operator-controlled means operable to one position for effecting a desired reduction in equalizing reservoir pressure and to another position for bottling up fluid in the equalizing reservoir at reduced pressure, maintaining valve means responsive to a preponderance in equalizing reservoir pressure over opposing brake pipe pressure in excess of a predetermined degree to move to an open position for effecting supply of fluid under pressure to said brake pipe, and means responsive to an increase in equalizing reservoir pressure in excess of a chosen degree, less than said predetermined degree, relative to an opposing pressure of fluid in a chamber having restricted communication with the brake pipe to effect an increase in the effective volume of said equalizing reservoir at a restricted rate as determined by the flow capacity of said restricted communication, which restricted rate corresponds substantially to the rate at which equalizing reservoir pressure increases due to the increase in temperature of equalizing reservoir fluid resulting from belated absorption of heat from the ambient air surrounding said reservoir following a reduction in the pressure and hence the temperature of fluid in the equalizing reservoir, whereby a reduction in equalizing reservoir pressure will be effected at a corresponding restricted rate for preventing operation of said maintaining valve means to its said open position unless brake pipe pressure reduces due to brake pipe leakage to an extent where the differential between equalizing reservoir pressure and brake pipe pressure exceeds said predetermined degree.

6. In a fluid pressure brake apparatus, the combination of a normally charged brake pipe, a normally charged equalizing reservoir, brake valve means for effecting a desired reduction in equalizing reservoir pressure and then bottling up fluid in said equalizing reservoir at the desired reduced pressure, brake pipe discharge valve means opened responsively to a reduction in equalizing reservoir pressure below brake pipe pressure for effecting a substantially corresponding reduction in brake pipe pressure and then closed for terminating such reduction in brake pipe pressure, and means subject to equalizing reservoir pressure and to an opposing pressure of fluid in a chamber open to the brake pipe, the last named means being normally biased to one position against equalizing reservoir pressure and responsive to an increase in equalizing reservoir pressure over chamber pressure to move to another position for so increasing the effective volume of said equalizing reservoir as to effect a predetermined limited reduction in equalizing reservoir pressure.

7. The combination according to claim 6, including means for providing a restricted rate of release of fluid under pressure from said chamber to said brake pipe, whereby said last named means will operate to effect such predetermined limited reduction in equalizing reservoir pressure at substantially the same rate as equalizing reservoir pressure increases due to the increase in equalizing reservoir temperature caused by belated absorption of heat from the ambient air through the reservoir wall.

8. In a fluid pressure brake apparatus, the combination of a normally charged brake pipe, a normally charged equalizing reservoir, brake valve means for effecting a desired reduction in equalizing reservoir pressure and then bottling up fluid in said equalizing reservoir at the reduced pressure, brake pipe discharge valve means opened responsively to a reduction in equalizing reservoir pressure below brake pipe pressure for effecting a substantially corresponding reduction in brake pipe pressure and then closed for terminating such reduction in brake pipe pressure, normally closed maintaining valve means opened whenever equalizing reservoir pressure exceeds brake pipe pressure by at least a predetermined degree for supplying fluid under pressure to said brake pipe, and means responsive to an increase in equalizing reservoir pressure in excess of a chosen degree, less than said predetermined degree, following closure of said brake pipe discharge valve means to so increase the effective volume of said equalizing reservoir as to nullify the effect of an increase in equalizing reservoir pressure of not exceeding a preselected overall amount for thereby assuring against said maintaining valve means operating to supply fluid under pressure to said brake pipe unless brake pipe pressure is reduced due to leakage in excess of said predetermined degree below the existing value of equalizing reservoir pressure.

9. In a fluid pressure brake apparatus, the combination of a normally charged brake pipe, a normally charged equalizing reservoir, operator-controlled brake valve means operable to a service position for effecting a service rate of reduction in equalizing reservoir pressure of a chosen degree and operable to a lap position for bottling up fluid in said equalizing reservoir at the chosen reduced pressure, brake pipe discharge valve means opened responsively to a reduction in equalizing reservoir pressure below brake pipe pressure for releasing fluid at a restricted rate from said brake pipe and closed when brake pipe pressure is reduced substantially to the value of equalizing reservoir pressure, a passageway, maintaining valve means normally closed and opened only when equalizing reservoir pressure exceeds brake pipe pressure by at least a predetermined degree for opening said passageway to said brake pipe, an operator-controlled brake pipe flat maintaining cut-out valve device variously conditionable to supply fluid to said passageway at the normal full charge value of brake pipe pressure or to prevent such supply, and displaceable means subject opposingly to equalizing reservoir pressure and pressure of fluid in a chamber having restricted communication with said brake pipe and normally biased to one position against equalizing reservoir pressure, said displaceable means being responsive to an increase in equalizing reservoir pressure in excess of a preselected degree, less than said predetermined degree, due to an increase in temperature of equalizing reservoir fluid caused by belated absorption of heat from the ambient air following closure of said brake pipe discharge valve means, to so increase the effective volume of said equalizing reservoir as to substantially nullify the effect of said increase in equalizing reservoir pressure and thereby assure against opening of said maintaining valve means unless brake pipe pressure reduces sufficiently due to leakage so that existing equalizing reservoir pressure exceeds brake pipe pressure by said predetermined degree.

References Cited in the file of this patent

UNITED STATES PATENTS 1,807,319     McCune _____ May 26, 1931